F. Kibler. Comb.d Rubber & Copper Wire Joint.

117546  
PATENTED AUG 1 1871

Witnesses:  
A. Bennenendorf  
Gustave Dieterich

Inventor:  
F. Kibler.  
Per  
Attorneys.

UNITED STATES PATENT OFFICE.

FREDERICK KIBLER, OF BALTIMORE, MARYLAND.

IMPROVEMENT IN COMBINED RUBBER AND COPPER-WIRE JOINTS FOR PIPE-COUPLINGS.

Specification forming part of Letters Patent No. 117,546, dated August 1, 1871.

*To all whom it may concern:*

Be it known that I, FREDERICK KIBLER, of Baltimore, in the county of Baltimore and State of Maryland, have invented a new and useful Improvement in Combined Rubber and Copper-Wire Joint; and I do hereby declare that the following is a full, clear, and exact description thereof, which will enable others skilled in the art to make and use the same, reference being had to the accompanying drawing forming part of this specification, in which—

Figure 1:
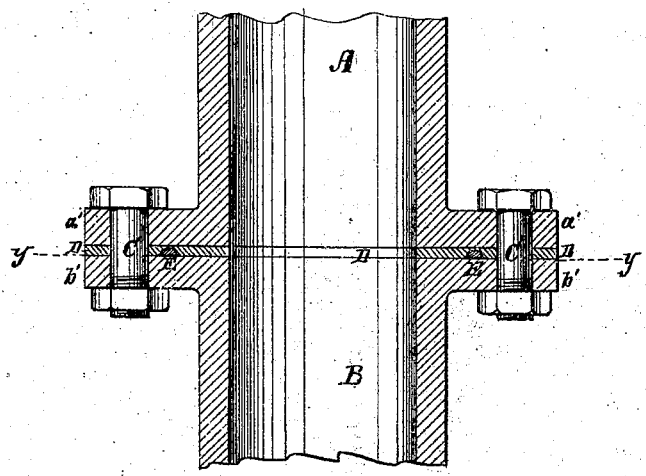
Figure 2:
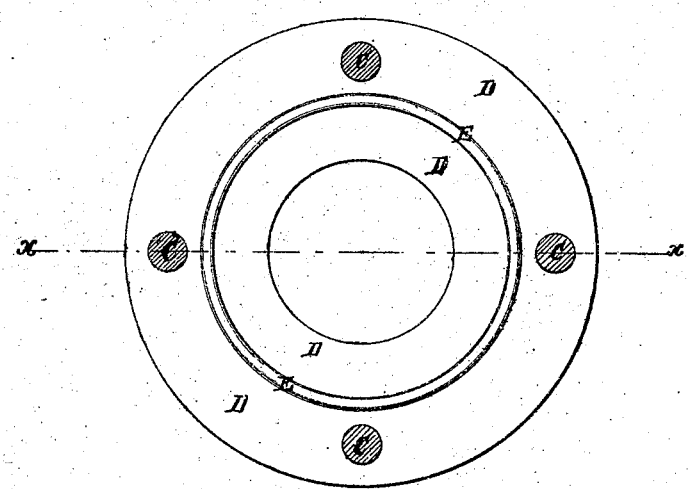

Figure 1 is a detail sectional view of my improved joint as applied to the adjacent ends of two lengths of steam-pipe taken through the line *x x*, Fig. 2. Fig. 2 is a detail section of the same taken through the line *y y*, Fig. 1.

Similar letters of reference indicate corresponding parts.

My invention has for its object to furnish an improved joint for water-pipes, steam-pipes, and steam-chests around bolts and in other places, whether the joint be round, square, or of any other shape, and which shall be simple in construction and reliable and effective in use; and consists in the rubber or equivalent plate and copper wire for forming the joint, as hereinafter more fully described.

A and B represent the adjacent ends of two lengths of pipe, upon which are formed flanges *a′ b′*, between the faces of which is formed the joint, and through which are formed the holes for the bolts C. D is a plate made of rubber or other suitable material, and cut to fit between the faces that form the joint. Upon the plate D is placed a copper wire, E, bent into a form corresponding with the hole or opening around which the joint is formed. The copper wire E, which forms the real joint, should be one size larger than the thickness of the rubber plate D, so that it may be flattened down between the faces of the joint, and may thus make the joint more perfect. This construction enables the wire E to be arranged upon the rubber plate D as may be desired, or so as to avoid flaws or imperfections in the plates or faces between which the joint is formed. If desired, the rubber plate D may be made double, with the copper wire E placed between them.

Having thus described my invention, I claim as new and desire to secure by Letters Patent—

The rubber plate D, whether single or double, and the copper wire E, arranged in connection with each other to form a joint, substantially as herein shown and described, and for the purpose set forth.

FREDERICK KIBLER.

Witnesses:
GEORGE W. RICHMOND,
JAMES LIVSEY.